United States Patent
Judd et al.

(10) Patent No.: US 11,674,527 B2
(45) Date of Patent: Jun. 13, 2023

(54) COMPRESSOR PORTED SHROUD WITH PARTICLE SEPARATOR

(71) Applicant: HONEYWELL INTERNATIONAL INC., Morris Plains, NJ (US)

(72) Inventors: Zedic Judd, Phoenix, AZ (US); Yogendra Sheoran, Scottsdale, AZ (US); Morris Anderson, Mesa, AZ (US); Tyler Crowe, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 44 days.

(21) Appl. No.: 16/895,127

(22) Filed: Jun. 8, 2020

(65) Prior Publication Data

US 2021/0381529 A1  Dec. 9, 2021

(51) Int. Cl.
| | |
|---|---|
| *F04D 29/70* | (2006.01) |
| *F02C 7/00* | (2006.01) |
| *F04D 29/40* | (2006.01) |
| *F04D 17/10* | (2006.01) |

(52) U.S. Cl.
CPC .............. *F04D 29/701* (2013.01); *F02C 7/00* (2013.01); *F04D 29/403* (2013.01); *F04D 17/10* (2013.01); *F05D 2220/32* (2013.01)

(58) Field of Classification Search
CPC .... F01D 25/32; F04D 29/403; F04D 29/4206; F04D 29/4213; F02C 7/052
See application file for complete search history.

(56) References Cited

U.S. PATENT DOCUMENTS

| | | |
|---|---|---|
| 5,039,317 A | 8/1991 | Thompson et al. |
| 2006/0073030 A1 | 4/2006 | McAuliffe et al. |
| 2008/0152500 A1* | 6/2008 | Mehring ................. F02C 7/052 |
| | | 416/181 |
| 2014/0294564 A1* | 10/2014 | Matwey ................ F04D 29/682 |
| | | 415/58.3 |
| 2017/0350420 A1 | 12/2017 | Lucas et al. |
| 2017/0370287 A1* | 12/2017 | Pearson .................... F01D 9/02 |
| 2020/0040819 A1 | 2/2020 | Walters et al. |

* cited by examiner

*Primary Examiner* — Topaz L. Elliott
*Assistant Examiner* — Cameron A Corday
(74) *Attorney, Agent, or Firm* — Lorenz & Kopf, LLP

(57) ABSTRACT

A ported shroud for a compressor associated with a gas turbine engine includes a primary inlet configured to be in fluid communication with the compressor, and the primary inlet is defined to extend along a central axis of the ported shroud. The ported shroud includes a bellmouth that surrounds the primary inlet, and a port plenum configured to be in fluid communication with the compressor. The port plenum extends along an axis that is transverse to the central axis of the ported shroud and transverse to a direction of fluid flow. The port plenum has a port plenum inlet defined about the axis, and the port plenum inlet is defined through the bellmouth such that a tortuous path is defined to the port plenum inlet. The port plenum including a port plenum outlet downstream from the port plenum inlet configured to be in fluid communication with the compressor.

20 Claims, 5 Drawing Sheets

US 11,674,527 B2

COMPRESSOR PORTED SHROUD WITH PARTICLE SEPARATOR

TECHNICAL FIELD

The present disclosure generally relates to gas turbine engines, and more particularly relates to a ported shroud associated with a compressor of a gas turbine engine having a particle separator.

BACKGROUND

In certain instances, gas turbine engines may be employed to generate power for various devices. For example, a gas turbine engine may be employed to generate power for a vehicle, such as an aircraft. In the example of the gas turbine engine generating power to a vehicle, during the operation of the gas turbine engine, air from the atmosphere is pulled into the gas turbine engine and used to generate energy for the vehicle. In certain operating environments, such as desert operating environments, the air in the atmosphere may contain fine sand and dust particles, which may be less than about 20 micrometers in size. Due to the small particle size of the fine sand and dust particles, these particles tend to follow the airflow through the gas turbine engine, and in certain instances, may flow into a port that supplies air to a compressor. The ingestion of these particles by the compressor from the port may cause erosion of a portion of the compressor contacted by the particles, which may reduce compressor performance.

Accordingly, it is desirable to provide a ported shroud for a compressor, which has a particle separator that reduces an amount of fine sand and dust particles that reach the compressor. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a ported shroud for a compressor associated with a gas turbine engine. The ported shroud includes a primary inlet configured to be in fluid communication with the compressor, and the primary inlet is defined to extend along a central axis of the ported shroud. The ported shroud includes a bellmouth that surrounds the primary inlet, and a port plenum configured to be in fluid communication with the compressor. The port plenum extends along an axis that is transverse to the central axis of the ported shroud and transverse to a direction of fluid flow. The port plenum has a port plenum inlet defined about the axis, and the port plenum inlet is defined through the bellmouth such that a tortuous path is defined to the port plenum inlet. The port plenum including a port plenum outlet downstream from the port plenum inlet configured to be in fluid communication with the compressor.

A ramp surface is defined proximate the port plenum inlet that extends outward in the direction of fluid flow. The ramp surface defines the tortuous path to the port plenum inlet to inhibit fine sand and dust particles from entering the port plenum inlet. The ramp surface extends at an angle of 90 degrees to 180 degrees relative to an exterior surface of the ported shroud. The ramp surface is upstream from the bellmouth in the direction of fluid flow. At least one strut interconnects the bellmouth with the ramp surface such that the port plenum inlet is discontinuous about a perimeter of the ported shroud. The port plenum inlet is orientated away from the direction of fluid flow toward the ported shroud. The port plenum outlet extends along a second axis, and the second axis is transverse to the axis. The port plenum is defined by a surface of the bellmouth that extends from the bellmouth to the port plenum outlet and an opposed second surface, and the surface of the bellmouth includes a rounded corner proximate the port plenum outlet.

Further provided is a ported shroud for a compressor associated with a gas turbine engine. The ported shroud includes a primary inlet configured to be in fluid communication with the compressor. The primary inlet is defined to extend along a central axis of the ported shroud. The ported shroud includes a bellmouth that surrounds the primary inlet, and a ramp surface defined about a perimeter of the ported shroud. The ramp surface is upstream from the bellmouth in a direction of fluid flow. The ported shroud includes a port plenum configured to be in fluid communication with the compressor. The port plenum extends along an axis that is transverse to the central axis of the ported shroud and the axis is transverse to the direction of fluid flow. The port plenum has a port plenum inlet defined about the axis, and the port plenum inlet is defined through the bellmouth proximate the ramp surface such that a tortuous path is defined to the port plenum inlet. The port plenum includes a port plenum outlet downstream from the port plenum inlet configured to be in fluid communication with the compressor.

The ramp surface extends outward in the direction of fluid flow and defines the tortuous path to the port plenum inlet to inhibit fine sand and dust particles from entering the port plenum inlet. The ramp surface extends at an angle of 90 degrees to 180 degrees relative to an exterior surface of the ported shroud. The ramp surface is upstream from the bellmouth in the direction of fluid flow. At least one strut interconnects the bellmouth with the ramp surface such that the port plenum inlet is discontinuous about a perimeter of the ported shroud. The port plenum inlet is orientated away from the direction of fluid flow toward the ported shroud. The port plenum outlet extends along a second axis, and the second axis is transverse to the axis. The port plenum is defined by a surface of the bellmouth that extends from the bellmouth to the port plenum outlet and an opposed second surface, and the surface of the bellmouth includes a rounded corner proximate the port plenum outlet.

Also provided is a gas turbine engine. The gas turbine engine includes an inlet duct, and a compressor downstream of the inlet duct configured to draw fluid into the inlet duct. The gas turbine engine includes a ported shroud disposed in the inlet duct and surrounding at least a portion of the compressor. The ported shroud includes a primary inlet configured to be in fluid communication with the compressor. The primary inlet is defined to extend along a central axis of the ported shroud. The ported shroud includes a bellmouth that surrounds the primary inlet, and a ramp surface that is defined about a perimeter of the ported shroud. The ported shroud includes a port plenum configured to be in fluid communication with the compressor, and the port plenum extends along an axis that is transverse to the central axis of the ported shroud. The port plenum has a port plenum inlet defined about the axis, and the port plenum inlet is defined through the bellmouth proximate the ramp surface such that a tortuous path is defined to the port plenum inlet to inhibit fine sand and dust particles from entering the port plenum inlet. The port plenum includes a port plenum outlet downstream from the port plenum inlet configured to be in fluid communication with the compressor.

The ramp surface extends outward in the direction of fluid flow and extends at an angle of 90 degrees to 180 degrees relative to an exterior surface of the ported shroud. At least one strut interconnects the bellmouth with the ramp surface such that the port plenum inlet is discontinuous about a perimeter of the ported shroud.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
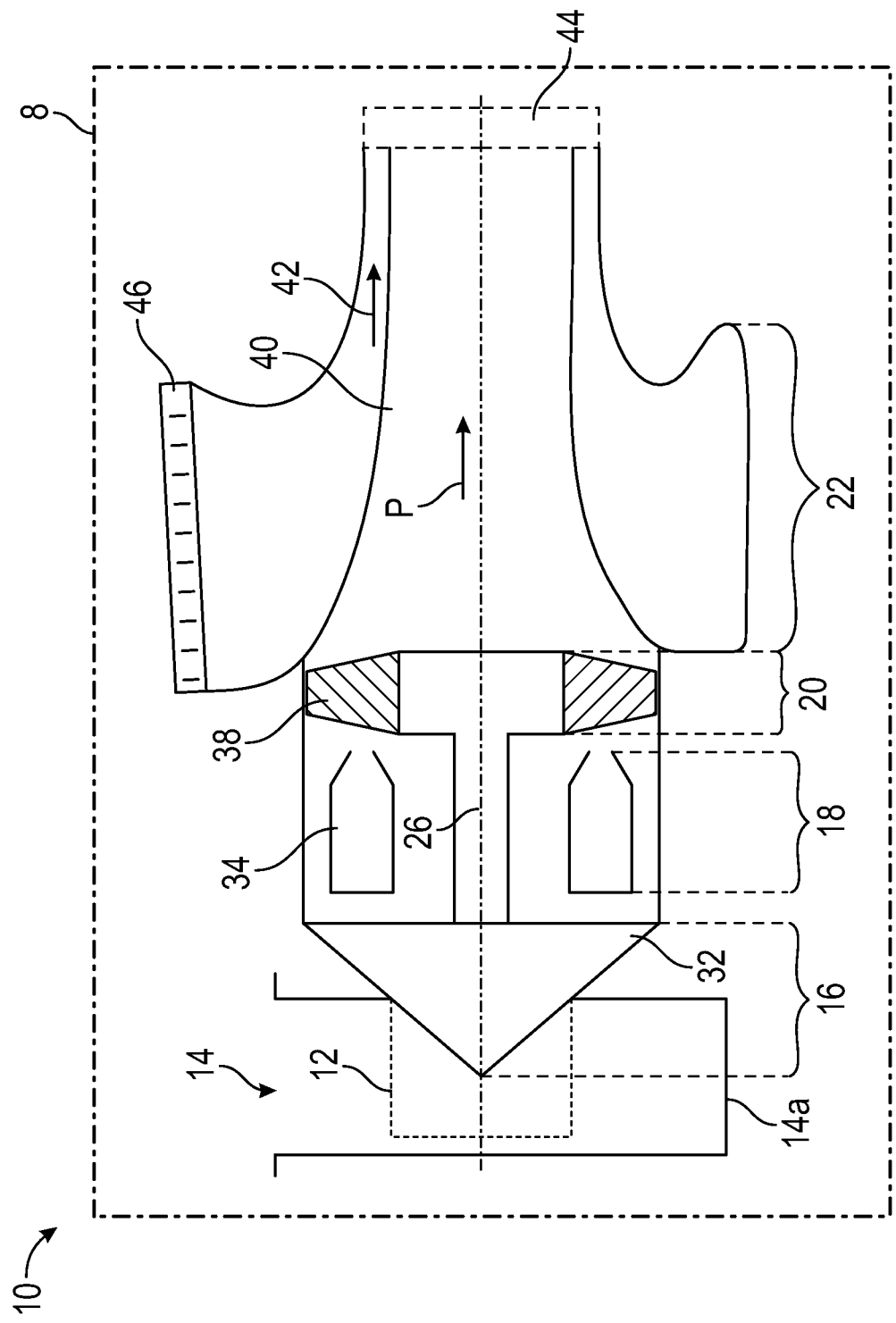
FIG. 1 is a schematic cross-sectional illustration of a gas turbine engine, which includes an exemplary ported shroud with a particle separator for a compressor associated with the gas turbine engine in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of component for a gas turbine engine that would benefit from a ported shroud with a particle separator and that the compressor for a gas turbine engine is merely one exemplary embodiment according to the present disclosure. Moreover, while the ported shroud is described herein as being used with a compressor of a gas turbine engine onboard a vehicle, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a simplified cross-sectional view of an exemplary gas turbine engine 10 is shown, which includes a ported shroud 12 according to various embodiments. In this example, the gas turbine engine 10 is employed with a vehicle, such as an aircraft 8, and in certain embodiments, the gas turbine engine 10 comprises a non-propulsive engine, such as an Auxiliary Power Unit (APU) deployed onboard the aircraft 8, although other arrangements and uses may be provided. In other embodiments, the gas turbine engine 10 may assume the form of an industrial power generator. In certain embodiments, the gas turbine engine is a turbofan gas turbine engine. Thus, the following description is merely one exemplary use of the ported shroud 12. As will be discussed, the ported shroud 12 provides a compressor 32 of the gas turbine engine 10 with fluid, such as air, which has a reduced amount of fine and sand dust particles. In one example, the ported shroud 12 reduces particle ingestion by the compressor 32 through a port plenum 66 to less than about 1%, and for example, to about 0.6%. Thus, as will be discussed, the ported shroud 12 generally inhibits the flow of fine sand and dust particles into the port plenum 66.

In this example, the gas turbine engine 10 includes an intake section 14, a compressor section 16, a combustor section 18, a turbine section 20, and an exhaust section 22. The intake section 14 includes an inlet duct 14a for receiving air from a source, such as a source external to the aircraft 8. The ported shroud 12 is positioned within the inlet duct 14a, and surrounds the compressor 32. A shaft 26 defines an axis of rotation for the gas turbine engine 10, which also comprises a longitudinal axis L of the gas turbine engine 10. The compressor section 16 includes the compressor 32, which is coupled to the shaft 26. However, in other embodiments, the number of compressors in the compressor section 16 may vary. In the depicted embodiment, the rotation of the shaft 26 drives the compressor 32, which draws in air from the inlet duct 14a of the intake section 14 through the ported shroud 12. The compressor 32 raises the pressure of the air and directs majority of the high pressure air into the combustor section 18. In this example, the compressor 32 is a radial compressor with a plurality of impeller blades 32a.

The combustor section 18 includes an annular combustor 34, which receives the compressed air from the compressor 32, and also receives a flow of fuel from a non-illustrated fuel source via a fuel metering valve (not shown). The fuel and compressed air are mixed within the combustor 34, and are combusted to produce relatively high-energy combustion gas. The relatively high-energy combustion gas that is generated in the combustor 34 is supplied to the turbine section 20. The turbine section 20 includes a turbine 38. However, it will be appreciated that the number of turbines, and/or the configurations thereof, may vary. The turbine 38 can comprise one of numerous types of turbines including, but not limited to, a vaned radial turbine, a vaneless radial turbine, and a vaned axial turbine. In this embodiment, the high-temperature combusted air from the combustor section 18 expands through and rotates the turbine 38. The air is then exhausted through the exhaust section 22. As the turbine 38 rotates, it drives equipment associated with the gas turbine engine 10 via a shaft or spool such as an electric generator, etc. The exhaust section 22 includes a primary flow duct 40 and a secondary flow duct 42. The primary flow duct 40 receives the combustion gases from the turbine section 20, and a secondary fluid from the secondary flow duct 42 is mixed with the primary fluid to cool or reduce the temperature of the primary fluid prior to exhausting the gases through an exhaust outlet 44.

Figure 2:
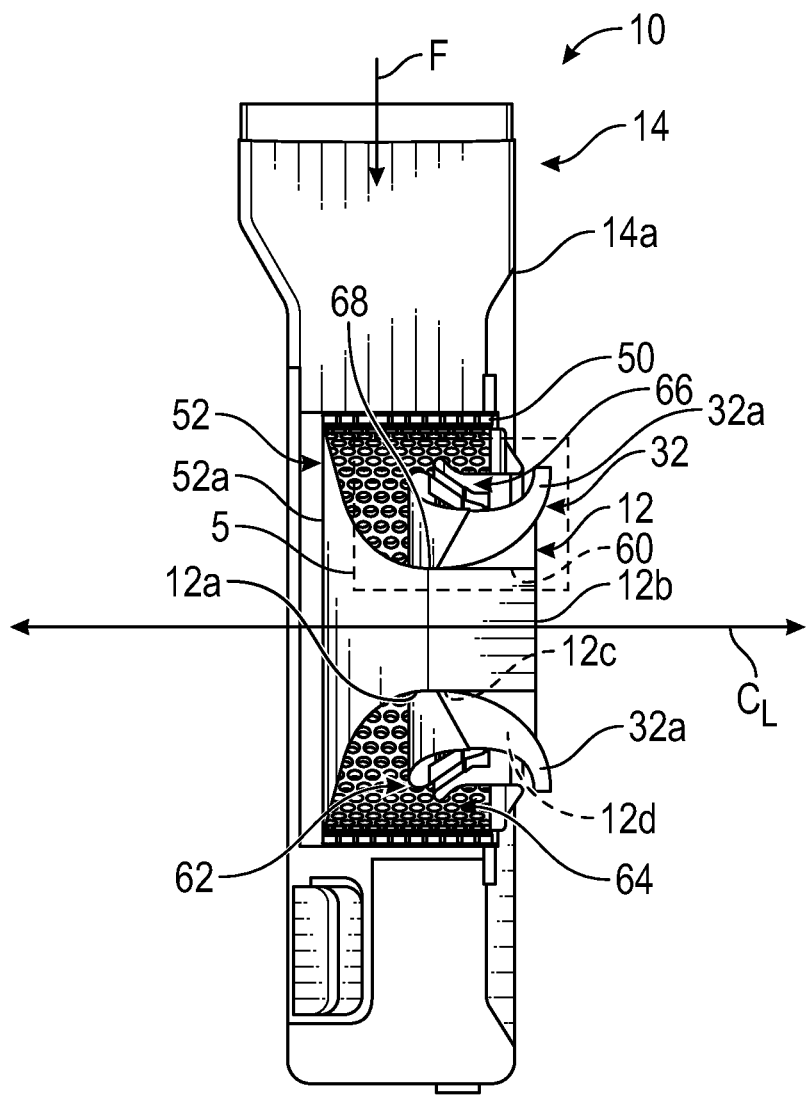
FIG. 2 is a cross-sectional view of an inlet section of the gas turbine engine of FIG. 1, which illustrates the exemplary ported shroud disposed within an inlet duct associated with the gas turbine engine.
Figure 3:
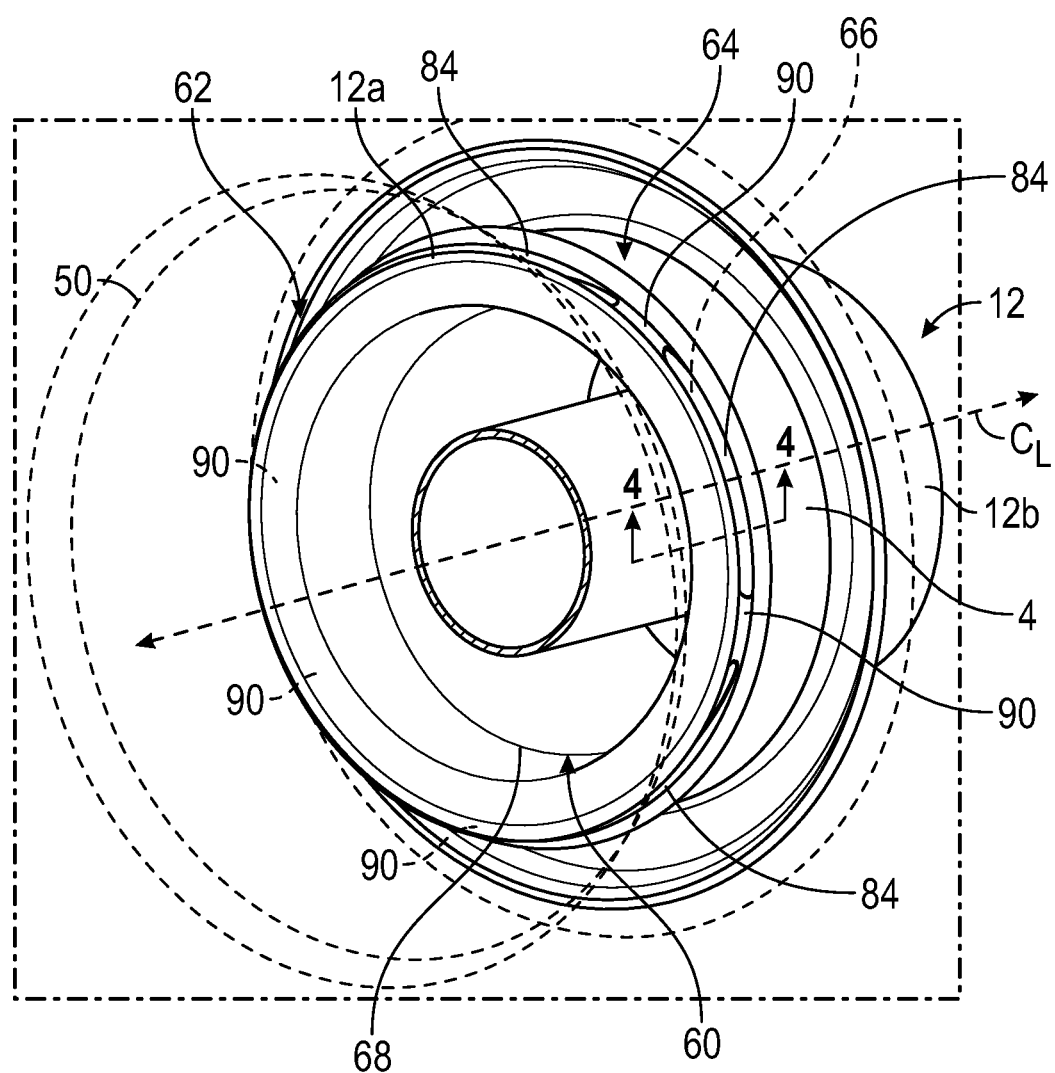
FIG. 3 is a schematic perspective view of a portion of the inlet section, which includes the ported shroud, a portion of a guide and a perforated screen disposed about the ported shroud.

With reference to FIG. 2, the ported shroud 12 is shown disposed in the inlet duct 14a. In one example, an annular perforated screen 50 is disposed in the inlet duct 14a and surrounds the ported shroud 12 (FIG. 3). In FIG. 3, the perforated screen 50 is shown schematically in dashed lines for clarity. The perforated screen 50 assists in directing the air into the ported shroud 12. In this example, a guide 52 is coupled to the perforated screen 50 to assist in directing the air into the compressor 32. As discussed, the compressor 32 is surrounded by the ported shroud 12. The ported shroud 12 is downstream from the perforated screen 50, and is downstream from a first end 52a of the guide 52. The guide 52 extends from the first end 52a to a second end 52b. The ported shroud 12 surrounds the second end 52b. The ported shroud 12 extends along a central axis CL, and the ported shroud 12 is asymmetric relative to the central axis CL. The central axis CL is parallel to the longitudinal axis L (FIG. 1) of the gas turbine engine 10, and in one example, is colinear with the longitudinal axis L (FIG. 1). The ported shroud 12 is composed of a metal or metal alloy, and may be manufactured as a one-piece, monolithic component using additive manufacturing, such as direct metal laser sintering (DMLS). The ported shroud 12 is substantially annular, and includes a central conduit 60, a bellmouth 62, a ramp surface 64 and a port plenum 66.

The central conduit 60 is defined along the central axis CL and is symmetric about the central axis CL. The central conduit 60 is defined through the ported shroud 12 from a first end 12a of the ported shroud 12 to an opposite second end 12b. The central conduit 60 defines a first, primary inlet 68 along the central axis CL. The primary inlet 68 receives a substantially majority of the air that enters the inlet duct 14a. For example, the primary inlet 68 receives at least 70% of the air that enters the inlet duct 14a. The primary inlet 68 is in fluid communication with or is fluidly coupled to the compressor 32. The compressor 32 is positioned within the central conduit 60 so as to be disposed between the primary inlet 68 and the second end 12b. Thus, in this example, the compressor 32 is received within the ported shroud 12 so as to be downstream of the primary inlet 68 to receive the fluid from the primary inlet 68 and the port plenum 66, as will be discussed.

Figure 4:
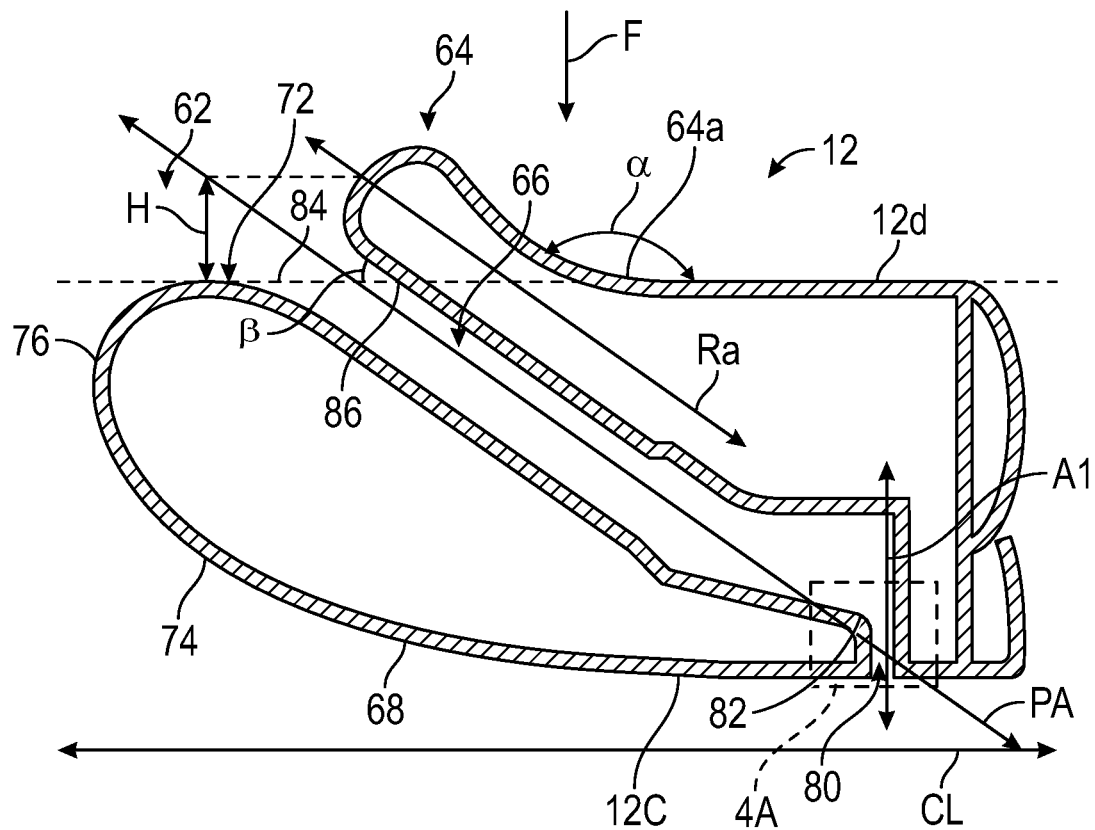
FIG. 4 is a cross-sectional view of a bellmouth, port plenum and ramp surface of the ported shroud, taken at line 4-4 of FIG. 3.
Figure 4A:
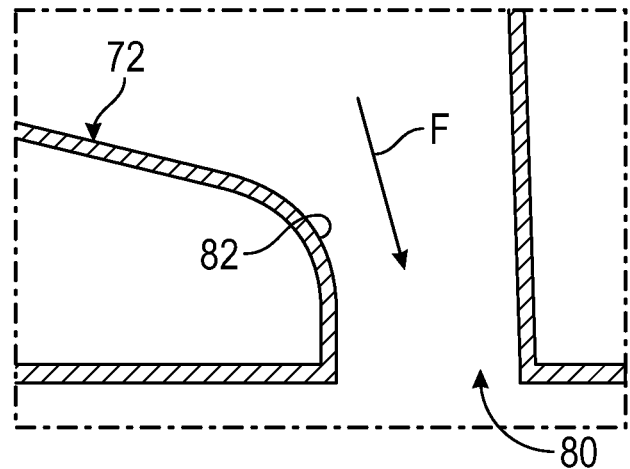
FIG. 4A is a detail of a port plenum outlet of the port plenum of the ported shroud taken at 4A on FIG. 4.

With reference to FIG. 3, the bellmouth 62 is defined about the first end 12a of the ported shroud 12 and extends about an entirety of a perimeter of the ported shroud 12 at the first end 12a. The bellmouth 62 surrounds the primary inlet 68. The bellmouth 62 is upstream from the primary inlet 68 in the direction of fluid flow F through the inlet duct 14a (FIG. 2), and directs the fluid from the inlet duct 14a to the primary inlet 68. With reference to FIG. 4, a cross-section of the bellmouth 62 is shown. The bellmouth 62 includes a first surface 72 of the port plenum 66, a second surface 74 and a curved bellmouth surface 76 that interconnects the first surface 72 with the second surface 74. Thus, in this example, the port plenum 66 is defined through the bellmouth 62, and the first surface 72 is a shared surface that defines a portion of the bellmouth 62 and the port plenum 66. The first surface 72 extends from the curved bellmouth surface 76 to a port plenum outlet 80. The first surface 72 may be sloped from the curved bellmouth surface 76 to the port plenum outlet 80. In one example, with reference to FIG. 4A, the first surface 72 includes a rounded corner 82 proximate the port plenum outlet 80. The rounded corner 82 assists in guiding the flow of fluid through the port plenum 66 into the port plenum outlet 80 and reduces pressure losses.

The second surface 74 extends along an interior surface 12c of the ported shroud 12 and is opposite the first surface 72. The second surface 74 is curved from the curved bellmouth surface 76 toward the primary inlet 68. The curved bellmouth surface 76 cooperates with the first surface 72 and the second surface 74 to define the shape of the bellmouth 62. Generally, the bellmouth 62 is a tapered expanding opening, which directs air drawn in through the inlet duct 14a into the primary inlet 68. With reference back to FIG. 2, the curved bellmouth surface 76 of the bellmouth 62 forms a leading edge of the ported shroud 12 and is spaced a distance apart from the first end 52a of the guide 52, which causes a portion of the air entering the inlet duct 14a to turn to enter into the primary inlet 68. The curved bellmouth surface 76 is generally defined along an exterior surface 12d of the ported shroud 12.

The ramp surface 64 extends about the perimeter of the ported shroud 12 and is defined on the exterior surface 12d of the ported shroud 12. With reference back to FIG. 4, the ramp surface 64 extends outwardly from the exterior surface 12d to force the air entering the inlet duct 14a to turn around the ramp surface 64 to enter into a port plenum inlet 84 of the port plenum 66. The ramp surface 64 extends for a height H above the exterior surface 12d. It should be noted that the height H of the ramp surface 64 above the exterior surface 12d may vary from that shown in FIG. 4, and may be greater or less than that shown in FIG. 4. As the air entrained with the fine sand and dust particles has a larger inertia than the air devoid of the fine sand and dust particles, the air entrained with the fine sand and dust particles flows over the ramp surface 64 and is unable to turn around the ramp surface 64 and enter into the port plenum inlet 84. This inhibits the fine sand and dust particles from entering the port plenum 66. Stated another way, the ramp surface 64 defines a tortuous path Tp to the port plenum inlet 84, which inhibits the flow of fine sand and dust particles into the port plenum 66. By inhibiting the flow of fine sand and dust particles into the port plenum 66, erosion of the compressor 32 downstream of the port plenum 66 is significantly reduced.

The ramp surface 64 generally extends along a ramp axis Ra, which is transverse or oblique to the central axis CL. Stated another way, the ramp surface 64 may be angled at an angle α defined between the ramp surface 64 and the exterior surface 12d of the ported shroud 12. Thus, the ramp surface 64 is angled at the angle α relative to the exterior surface 12d of the ported shroud 12. The angle α is about 90 to about 180 degrees, and in this example, is about 140 degrees to about 150 degrees. An angle β, which is a supplementary angle to the angle α, may vary from about 0 degrees to about 90 degrees, based on the value of the angle α. The angle β is defined between a reference line planar to the exterior surface 12d of the ported shroud 12 and the ramp surface 64a. In this example, the angle β is about 40 degrees to about 30 degrees. Generally, the sum of the angle α and the angle β is about 180 degrees. By extending at the angle α, the ramp surface 64 faces into the flow of the fluid from the inlet duct 14a to define the tortuous path Tp, and launches the air with the entrained fine sand and dust particles past the port plenum inlet 84 and around the bellmouth 62 into the primary inlet 68. The ramp surface 64 may also include a ramp curved surface 64a, which smoothly directs the air over the ramp surface 64. The ramp surface 64 is defined proximate or adjacent to the port plenum inlet 84 and extends outwardly from the exterior surface 12d into the direction of the flow of air into the inlet duct 14a (FIG. 2). The ramp surface 64 is upstream from the bellmouth 62 in the direction of fluid flow F through the inlet duct 14a (FIG. 2).

Figure 5:
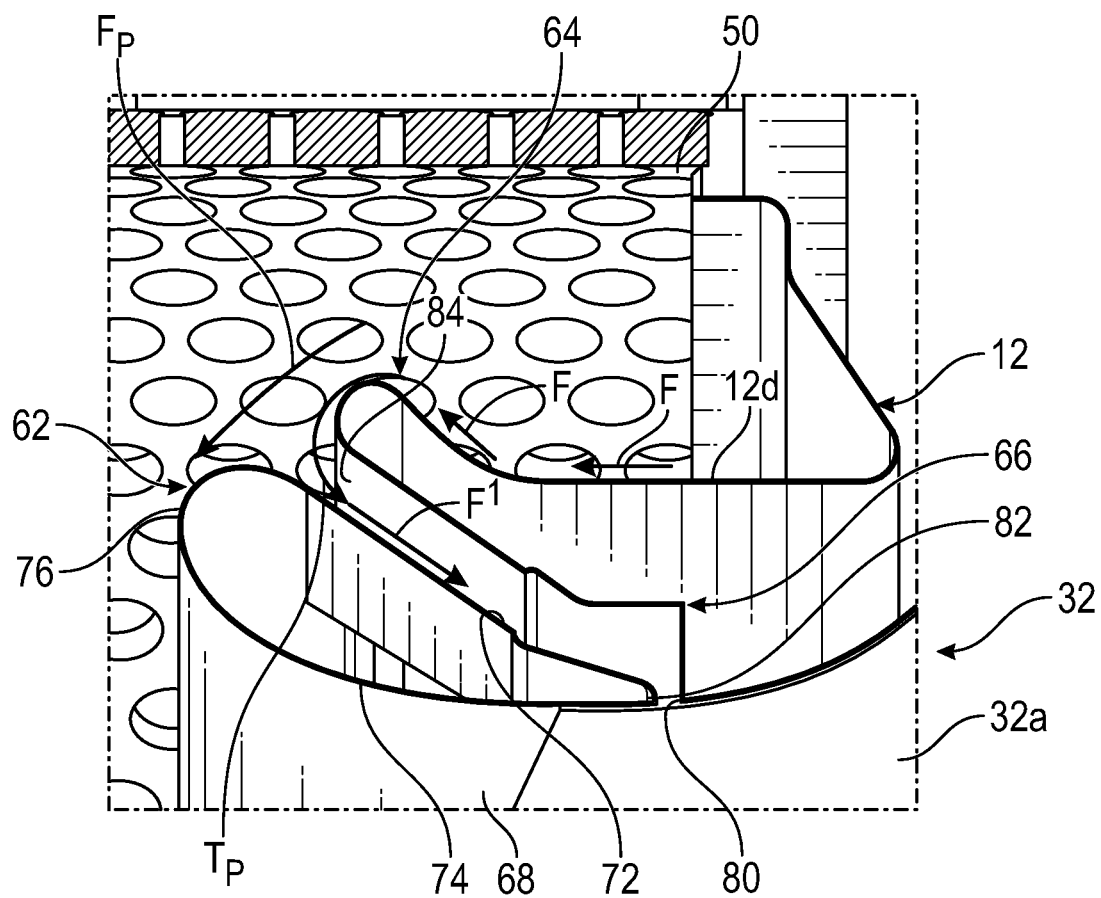
FIG. 5 is a detail view of a portion of the inlet section taken at 5 on FIG. 2.

The port plenum 66 is defined about the perimeter of the ported shroud 12. The port plenum 66 includes the port plenum inlet 84, which is upstream from the port plenum outlet 80. The port plenum inlet 84 is defined through the bellmouth 62, and is defined by the first surface 72 and an opposite surface 86. The surface 86 is opposite the ramp surface 64. Stated another way, the port plenum 66 is defined through the bellmouth 62 so as to be downstream of the ramp surface 64, as shown in FIG. 5. FIG. 5 is a detail view of the bellmouth 62, the ramp surface 64 and the port plenum 66. As shown, air F that enters into the inlet duct 14a is directed down to the exterior surface 12d of the ported shroud 12, where it flows over the ramp surface 64. The ramp surface 64 faces into the flow of the air F, and is upstream from the port plenum 66. Air Fp that includes fine sand and dust particles is unable to turn into the port plenum inlet 84, and is directed over the bellmouth 62 into the primary inlet 68. Air F' devoid of the fine sand and dust particles is able to follow the tortuous path Tp defined by the ramp surface 64 and turn into the port plenum inlet 84. Thus, the ramp surface 64 acts as a particle separator and inhibits the flow of the air Fp entrained with the fine sand and dust particles into the port plenum 66.

With reference back to FIG. 4, the port plenum inlet 84 is defined along a port plenum axis PA, which is transverse or oblique to the central axis CL. The port plenum axis PA is also transverse or oblique to a direction of fluid flow or air flow F into the inlet duct 14a. The port plenum inlet 84 is orientated away from the air that is drawn into the inlet duct 14a (FIG. 2). A majority of the port plenum 66 extends along the port plenum axis PA. The port plenum 66 is defined as a converging channel, which reduces a pressure drop along the port plenum 66 and improves performance of the compressor 32. A lateral flow area defined by the port plenum 66 is converging (such that the port plenum 66 is a converging channel) as a radius of the ported shroud 12 decreases from the port plenum inlet 84 to the port plenum outlet 80. The port plenum outlet 80 is downstream of the port plenum inlet 84 and is in fluid communication with the compressor 32. The port plenum outlet 80 is a continuous opening defined about the perimeter or circumference of the ported shroud 12. In this example, the port plenum outlet 80 is defined along an axis A1, which is perpendicular to the central axis CL and transverse to the port plenum axis PA. By providing the port plenum outlet 80 along the axis A1, the port plenum outlet 80 directs the air F' (FIG. 5) onto the impeller blades 32a of the compressor 32 (FIG. 5), which improves a surge margin of the compressor 32.

With reference back to FIG. 3, one or more struts 90 span the port plenum inlet 84. In this example, the ported shroud 12 includes about five struts 90, which span the port plenum inlet 84 to provide structural support to the bellmouth 62. The struts 90 interrupt the port plenum inlet 84 such that the port plenum inlet 84 is discontinuous about a perimeter or circumference of the ported shroud 12. The struts 90 are integrally formed between the bellmouth 62 and the ramp surface 64, which results in the port plenum inlet 84 having an oval or race-track opening. The struts 90 result in the ported shroud 12 being asymmetric about the center axis CL. It should be noted that in certain embodiments, the ported shroud 12 need not include the struts 90.

In one example, with reference to FIG. 2, with the ported shroud 12 formed via additive manufacturing, such as DMLS, the ported shroud 12 may be positioned within the inlet duct 14a so as to surround the guide 52 and the compressor 32. In one example, the ported shroud 12 may be pinned to a surface of the inlet duct 14a to couple the ported shroud 12 about the guide 52 and the compressor 32. The perforated screen 50 may be positioned about the ported shroud 12. As the compressor 32 rotates, air F is drawn into the inlet duct 14a. With reference to FIG. 5, as the air F is drawn into the inlet duct 14a, the air F follows the ramp surface 64. The air Fp with the entrained fine sand and dust particles is unable to follow the tortuous path Tp defined by the ramp surface 64 into the port plenum inlet 84 due to the inertia of the fine sand and dust particles. The air Fp with the entrained fine sand and dust particles flows over the ramp surface 64, around the bellmouth 62 into the primary inlet 68 and into the compressor 32. The air F' devoid of the fine sand and dust particles is able to navigate the tortuous path Tp, and flows around the ramp surface 64 into the port plenum inlet 84. The air F' flows through the port plenum 66 and exits onto the compressor 32 at the port plenum outlet 80.

Thus, the ramp surface 64 of the ported shroud 12 serves as a particle separator, which inhibits the flow of the air Fp with the entrained fine sand and dust particles into the port plenum 66 and into the compressor 32 downstream at a concentrated area. The ported shroud 12 reduces the amount of fine sand and dust particles that are ingested by the compressor 32 via the port plenum 66, which reduces erosion of the compressor 32 at the concentrated area near the port plenum outlet 80 of the port plenum 66.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A ported shroud for a compressor associated with a gas turbine engine, comprising:
    a primary inlet configured to be in fluid communication with the compressor, the primary inlet defined to extend along a central axis of the ported shroud;
    a bellmouth that surrounds the primary inlet and extends about a perimeter of the ported shroud; and
    a port plenum configured to be in fluid communication with the compressor, the port plenum extending along a port plenum axis from a port plenum inlet to proximate a port plenum outlet, the port plenum axis transverse to the central axis of the ported shroud and transverse to a direction of fluid flow, the port plenum axis defined through the port plenum inlet and aligned with the port plenum inlet, the port plenum inlet defined through the bellmouth at the perimeter such that a tortuous path is defined to the port plenum inlet, the port plenum inlet discrete from the primary inlet, the port plenum including the port plenum outlet downstream from the port plenum inlet configured to direct fluid onto the compressor.

2. The ported shroud of claim 1, wherein a ramp surface is defined proximate the port plenum inlet that extends outward in the direction of fluid flow.

3. The ported shroud of claim 2, wherein the ramp surface defines the tortuous path to the port plenum inlet to inhibit fine sand and dust particles from entering the port plenum inlet.

4. The ported shroud of claim 2, wherein the ramp surface extends at an angle of 90 degrees to 180 degrees relative to an exterior surface of the ported shroud.

5. The ported shroud of claim 2, wherein the ramp surface is upstream from the bellmouth in the direction of fluid flow, and the port plenum inlet is upstream from the primary inlet.

6. The ported shroud of claim 2, wherein at least one strut interconnects the bellmouth with the ramp surface such that the port plenum inlet is discontinuous about the perimeter of the ported shroud, the port plenum outlet is a continuous opening defined about the perimeter of the ported shroud and the ported shroud is asymmetric relative to the central axis.

7. The ported shroud of claim 6, wherein the port plenum inlet has race-track shaped openings and the port plenum defines a converging channel from the port plenum inlet to the port plenum outlet.

8. The ported shroud of claim 2, wherein the port plenum is defined between a surface of the bellmouth that extends from the bellmouth to the port plenum outlet and an opposed second surface, the second surface is opposite the ramp surface, and the surface of the bellmouth includes a rounded corner proximate the port plenum outlet.

9. The ported shroud of claim 1, wherein the port plenum inlet is orientated away from the direction of fluid flow toward the ported shroud.

10. The ported shroud of claim 1, wherein the port plenum outlet extends along an outlet axis, and the outlet axis is transverse to the port plenum axis and perpendicular to the central axis.

11. A ported shroud for a compressor associated with a gas turbine engine, comprising:
    a primary inlet configured to be in fluid communication with the compressor, the primary inlet defined to extend along a central axis of the ported shroud;
    a bellmouth that surrounds the primary inlet and extends about a perimeter of the ported shroud;
    a ramp surface defined about the perimeter of the ported shroud, the ramp surface upstream from the bellmouth in a direction of fluid flow; and
    a port plenum configured to be in fluid communication with the compressor, the port plenum extending along a port plenum axis from a port plenum inlet to proximate a port plenum outlet, the port plenum axis transverse to the central axis of the ported shroud and the port plenum axis is transverse to the direction of fluid flow, the port plenum axis defined through the port plenum inlet and aligned with the port plenum inlet, the port plenum inlet defined through the bellmouth at the perimeter proximate the ramp surface such that a tortuous path is defined to the port plenum inlet, the port plenum inlet upstream from the primary inlet, the port plenum including the port plenum outlet downstream from the port plenum inlet configured to direct fluid onto the compressor and the port plenum outlet extends along an outlet axis that is perpendicular to the central axis and transverse to the port plenum axis.

12. The ported shroud of claim 11, wherein the ramp surface extends outward in the direction of fluid flow and defines the tortuous path to the port plenum inlet to inhibit fine sand and dust particles from entering the port plenum inlet.

13. The ported shroud of claim 11, wherein the ramp surface extends at an angle of 90 degrees to 180 degrees relative to an exterior surface of the ported shroud.

14. The ported shroud of claim 11, wherein a plurality of struts interconnect the bellmouth with the ramp surface such that the port plenum inlet is discontinuous about the perimeter of the ported shroud, the port plenum outlet is a continuous opening defined about the perimeter of the ported shroud and the ported shroud is asymmetric relative to the central axis.

15. The ported shroud of claim 14, wherein the port plenum inlet has race-track shaped openings defined by the plurality of struts and the port plenum defines a converging channel from the port plenum inlet to the port plenum outlet.

16. The ported shroud of claim 11, wherein the port plenum inlet is orientated away from the direction of fluid flow toward the ported shroud.

17. The ported shroud of claim 11, wherein the port plenum is defined between a surface of the bellmouth that extends from the bellmouth to the port plenum outlet and an opposed second surface, the second surface is opposite the ramp surface, and the surface of the bellmouth includes a rounded corner proximate the port plenum outlet.

18. A gas turbine engine, comprising:
    an inlet duct;

a compressor downstream of the inlet duct and configured to draw fluid into the inlet duct, the compressor including at least one impeller blade; and a ported shroud disposed in the inlet duct and surrounding at least a portion of the compressor, the ported shroud including:

a primary inlet configured to be in fluid communication with the compressor, the primary inlet defined to extend along a central axis of the ported shroud and the ported shroud is asymmetric relative to the central axis;

a bellmouth that surrounds the primary inlet and extends about a perimeter of the ported shroud, the bellmouth defines an exterior surface of the ported shroud;

a ramp surface defined about the perimeter of the ported shroud;

a port plenum configured to be in fluid communication with the compressor, the port plenum extending along a port plenum axis from a port plenum inlet to proximate a port plenum outlet, the port plenum axis transverse to the central axis of the ported shroud, the port plenum axis defined through the port plenum inlet and aligned with the port plenum inlet, the port plenum inlet defined through the bellmouth at the perimeter downstream of the ramp surface such that a tortuous path is defined to the port plenum inlet to inhibit fine sand and dust particles from entering the port plenum inlet, the port plenum inlet upstream from the primary inlet in a direction of fluid flow through the inlet duct, the port plenum defined by a surface opposite the ramp surface such that the port plenum inlet is discrete from the primary inlet, the port plenum including the port plenum outlet downstream from the port plenum inlet configured to direct fluid onto the at least one impeller blade of the compressor and the port plenum outlet is a continuous opening defined about the perimeter of the ported shroud; and a plurality of struts that span the port plenum inlet and interconnect the bellmouth with the ramp surface such that the port plenum inlet is discontinuous about the perimeter of the ported shroud.

19. The gas turbine engine of claim 18, wherein the ramp surface extends outward in the direction of fluid flow and extends at an angle of 90 degrees to 180 degrees relative to the exterior surface of the ported shroud.

20. The gas turbine engine of claim 18, wherein the port plenum inlet has race-track shaped openings defined by the plurality of struts.

* * * * *